US00RE38104E

(19) United States
(12) Reissued Patent
Gosling

(10) Patent Number: US RE38,104 E
(45) Date of Reissued Patent: Apr. 29, 2003

(54) METHOD AND APPARATUS FOR RESOLVING DATA REFERENCES IN GENERATED CODE

(75) Inventor: James Gosling, Redwood City, CA (US)

(73) Assignee: Sun Microsystems, Inc., Palo Alto, CA (US)

( * ) Notice: This patent is subject to a terminal disclaimer.

(21) Appl. No.: 09/261,970

(22) Filed: Mar. 3, 1999

Related U.S. Patent Documents

Reissue of:
(64) Patent No.: 5,367,685
Issued: Nov. 22, 1994
Appl. No.: 07/994,655
Filed: Dec. 22, 1992

(51) Int. Cl.[7] ..... G06F 9/45
(52) U.S. Cl. ..... 717/140; 717/106; 717/136; 717/139; 717/142; 717/146
(58) Field of Search ..... 717/2, 5, 7, 8, 717/106–108, 114, 116, 146–147

(56) References Cited

U.S. PATENT DOCUMENTS

| | | | | |
|---|---|---|---|---|
| 4,636,940 A | * | 1/1987 | Goodwin, Jr. | 717/4 |
| 4,667,290 A | | 5/1987 | Goss et al. | |
| 4,667,920 A | * | 5/1987 | Goss et al. | 248/610 |
| 4,686,623 A | * | 8/1987 | Wallace | 717/8 |
| 4,729,096 A | * | 3/1988 | Larson | 717/5 |
| 4,773,007 A | * | 9/1988 | Kanada et al. | 717/9 |
| 5,201,050 A | * | 4/1993 | McKeeman et al. | 717/7 |
| 5,230,050 A | * | 7/1993 | Iitsuka et al. | 717/7 |
| 5,276,881 A | | 1/1994 | Chan et al. | |
| 5,280,613 A | | 1/1994 | Chan et al. | |
| 5,307,492 A | * | 4/1994 | Benson | 717/7 |
| 5,313,614 A | * | 5/1994 | Goettelmann et al. | 717/5 |
| 5,339,419 A | | 8/1994 | Chan et al. | |
| 5,347,632 A | | 9/1994 | Filepp et al. | |
| 5,428,792 A | | 6/1995 | Conner et al. | |

(List continued on next page.)

OTHER PUBLICATIONS

Adele Goldberg and David Robson, "Smalltalk–80–The Language and its Implementation", Xerox Palo Alto Research Center, 1983 (reprinted with corrections, Jul. 1985) pp. 1–720.

(List continued on next page.)

*Primary Examiner*—Thomas M. Heckler
(74) *Attorney, Agent, or Firm*—Finnegan, Henderson, Farabow, Garrett & Dunner, L.L.P.

(57) ABSTRACT

A hybrid compiler-interpreter comprising a compiler for "compiling" source program code, and an interpreter for interpreting the "compiled" code, is provided to a computer system. The compiler comprises a code generator that generates code in intermediate form with data references made on a symbolic basis. The interpreter comprises a main interpretation routine, and two data reference handling routines, a dynamic field reference routine for handling symbolic references, and a static field reference routine for handling numeric references. The dynamic field reference routine, when invoked, resolves a symbolic reference and rewrites the symbolic reference into a numeric reference. After re-writing, the dynamic field reference routine returns to the main interpretation routine without advancing program execution to the next instruction, thereby allowing the rewritten instruction with numeric reference to be reexecuted. The static field reference routine, when invoked, obtain data for the program from a data object based on the numeric reference. After obtaining data, the static field reference routine advances program execution to the next instruction before returning to the interpretation routine. The main interpretation routine selectively invokes the two data reference handling routines depending on whether the data reference in an interaction in a symbolic or a numeric reference.

31 Claims, 5 Drawing Sheets

U.S. PATENT DOCUMENTS

| | | | | |
|---|---|---|---|---|
| 5,442,771 A | | 8/1995 | Filepp et al. | |
| 5,594,910 A | | 1/1997 | Filepp et al. | |
| 5,613,117 A | * | 3/1997 | Davidson et al. | 717/8 |
| 5,649,204 A | | 7/1997 | Pickett | |
| 5,758,072 A | | 5/1998 | Filepp et al. | |
| 5,836,014 A | * | 11/1998 | Faiman, Jr. | 717/7 |

OTHER PUBLICATIONS

Andrew Black, Norman Hutchinson, Eric Jul and Henry Levy, "Distribution and Abstract Types in Emerald", University of Washington, Technical Report No. 85–08–05, Aug. 1985, pp. 1–10.

Andrew Black, Norman Hutchinson, Eric Jul, and Henry Levy, "Object Structure in the Emerald System", University of Washington, Technical Report 86–04–03, Apr. 1986, pp. 1–14.

Andrew Blaine Proudfoot, "Replects: data replication in the Eden System", Department of Computer Science, University of Washington, Technical Report No. TR–85–12–04, Dec. 1985, pp. 1–156.

Andrew P. Black and Henry M. Levy, "A Language for Distributed Programming", Department of Computer Science, University of Washington, Technical Report 86–02–03, Feb. 1986, p. 10.

Andrew P. Black, "Supporting Distributed Applications: Experience with Eden", Department of Computer Science, University of Washington, Technical Report 85–03–02, Mar. 1985, pp. 1–21.

Andrew P. Black, "The Eden Programming Language", Department of Computer Science, FR–35, University of Washington, Technical Report 85–09–01, Sep. 1985 (Revised, Dec. 1985), pp. 1–19.

Andrew P. Black, "The Eden Project: Overview and Experiences", Department of Computer Science, University of Washington, EUUG, Autumn '86 Conference Proceedings, Manchester, UK, Sep. 22–25 1986, pp. 177–189.

Andrew P. Black, Edward D. Lazowska, Jerre D. Noe and Jan Sanislo, "The Eden Project: A Final Report", Department of Computer Science, University of Washington, Technical Report 86–11–01, Nov. 1986, pp. 1–28.

Calton Pu, "Replication and Nested Transactions in the Eden Distributed System", Doctoral Disseration, University of Washington, Aug. 6, 1986, pp. 1–179 (1 page Vita).

Cara Holman and Guy Almes, "The Eden Shared Calendar System", Department of Computer Science, FR–35, University of Washington, Technical Report 85–05–02, Jun. 22, 1985, pp. 1–14.

Eric Jul, "Object Mobility in a Distributed Object–Oriented System", a Dissertation, University of Washington, 1989, pp. 1–154 (1 page Vita).

Eric Jul, Henry Levy, Norman Hutchinson, and Andrew Black, "Fine–Grained Mobility in the Emerald System", University of Washington, ACM Transactions on Computer Systems, vol. 6, No. 1, Feb. 1988, pp. 109–133.

Felix Samson Hsu, "Reimplementing Remote Procedure Calls", University of Washington, Thesis Mar. 22, 1985, pp. 1–106.

Guy Almes, Andrew Black, Carl Bunje and Douglas Wiebe, "Edmas: A locally Distributed Mail System", Department of Computer Science, University of Washington, Technical Report 83–87–01, Jul. 7, 1983, Abstract & pp. 1–17.

Guy T. Almes, "Integration and Distribution in the Eden System", Department of Computer Science, University of Washington, Technical Report 83–01–02, Jan. 19, 1983, pp. 1–18 & Abstract.

Guy T. Almes, "The Evolution of th Eden Invocation Mechanism", Department of Computer Science, University of Washington, Technical Report 83–01–03, Jan. 19, 1983, pp. 1–14 & Abstract.

Guy T. Almes, Andrew P. Black, Edward D. Lazawska, and Jerre D. Noe, "The Eden System: A Technical Review", Department of Computer Science, University of Washington, Technical Report 83–10–05, Oct. 1983, pp. 1–25.

Guy T. Almes, Michael J. Fischer, Hellmut Golde, Edward D. Lazawska, Jerre D. Noe, "Research in Integrated Distributed Computing", Department of Computer Science, University of Washington, Oct. 1979, pp. 1–42.

Krasner et al., "Smalltalk–80: Bits of History, Words of Advice", 1983 Xerox Corporation, pp. 1–344.

Norman C. Hutchinson, "Emerald: An Object–Based Language for Distributed Programming", a Dissertation, University of Washington, 1987, pp. 1–107.

Proceedings of the Eighth Symposium on Operating Systems Principles, Dec. 14–16, 1981, ACM, Special Interest Group on Operating Systems, Association for Computing Machinery, vol. 15, No. 5, Dec. 1981, ACM Order No. 534810.

Wm. A. Wulf, "PQCC: A Machine–Relative Compiler Technology," Carnegie–Mellon University, Pittsburgh, PA, Sep. 1980, pp. 1–22.

Inder–jeet S. Gujral, "Retargetable Code Generation for ADA* Compilers", SoftTech, Inc., Waltham, MA, Dec., 1981, pp. 1–13.

Nori et al., "The Pascal <P> Compiler: Implementation Notes", Jul. 1976, pp. 1–53.

Glanville et al., "A New Method for Compiler Code Generation (Extended Abstract)", Computer Science Division, University of California, Berkeley, CA, pp. 231–240.

Colusa Software White Paper: "Omniware Technical Overview", Colusa Software, Inc., 1995, pp. 1–14.

Colusa Software White Paper: Omniware: A Universal Substrate for Mobile Code: Colusa Software, Inc., pp. 1–13.

Ali–Reza Adl–Tabatabai et al., "Efficient and Language–Independent Mobile Programs", Proceedings of PLDI '96, ACM SIGPLAN '96 Conf. on Programming Language Design and Implementation, May, 1996, pp. 1–10.

Lucco et al., "Omniware: A Universal Substrate for Web Programming", pp. 1–11.

Wahbe et al., "Efficient Software–Based Fault Isolation", Computer Science Division, University of California, Berkeley, CA, pp. 203–216.

Graham et al., "Adaptable Binary Programs", 1995 Usenix Technical Conference—Jan., 1995, New Orleans, LA, pp. 315–325.

Steven Lucco, "High–Performance Microkernel Systems", School of Computer Science, Carengie Mellon University. p. 1.

Sawdon et al., "A Preliminary Report on Software Prefetching in the Instruction Stream", School of Computer Science, Carnegie Mellon University, Pittsburgh, PA, pp. 1–7.

Bolosky, et al., "Operating System Directions for the Next Millennium", Microsoft Research, Redmond, WA, pp. 1–7.

1995 Project Summaries: "Software System Support for High Performance Multicomputing", School of Computer Science, Carnegie Mellon University, Jul. 1995, pp. 1–4.

Ernst et al., "Code Compression", 1997, pp. 358–365.
Peter Deutsch et al., "Efficient Implementation of the Smalltalk–80 System", 1983, pp. 297–302.
Engelstad et al., "A Dynamic C–Based Object–Oriented System for UNIX", IEEE Software, May, 1991, pp. 73–85.
Gerring, et al., "S–1 U–Code, A Universal P–Code for the S–1 Project (PAIL–6)", Stanford University, Computer Science Department, Technical Note No. 159, Aug., 1979, pp. 1–7.
Gary McWilliams, "Digital's Architectural Gamble", Datamation, Mar., 1989, pp. 14–24.
"Architecture–Neutral Distribution Format", Open Software Foundation, Cambridge, MA, pp. 1–3.
Wolf et al., "Portable Compiler Eases Problems of Software Migration", System Design/Software, pp. 147–153.
Fischer et al., "Crafting a Compiler", 1988, pp. 551–555, 632–641.
Anklam et al., "Engineering a Compiler, VAX–11 Code Generation and Optimization", 1982 Digital Equipment Corporation, pp. 124–137.
Tanenbaum et al., "A Practical Tool Kit for Making Portable Compilers", Computing Practices, Communications of the ACM, Sep., 1983, vol. 26, No. 9, pp. 654–660.
Almasi et al., "Highly Parallel Computing", pp. 247–277.
Ann Sussman, "OSF Eyes Shrink–Wrap RFT", Unix Today, pp. 1, 43.
Evan Grossman, "OSF Adds Ingredients to Operating System", PC Week, Mar. 27, 1989.
Sites et al., Universal P–Code Definition, Version 0.3, Department of Electrical Engineering and Computer Sciences, University of California at San Diego, Jul. 1979, pp. 5–9.
Goldberg et al., "Smalltalk–80: The Language and Its Implementation", Addison–Wesley, Reading, MA, 1983, pp. 594–598.
Richard L. Sites and Daniel R. Perkins, "Universal P–Code Definition, version (0.3)," Dept. of Electrical Engineering and Computer Sciences, University of California at San Diego, Jul., 1979, pp. 1–40.
Richard L. Sites et al., "Machine–Independent Pascal Optimizer Project," UCSD/CS–79/038, Nov. 1979, pp. 1–94.
Peter Nye, U–CODE: An Intermediate Language for Pascal and Fortran (PAIL–8), Feb. 16, 1980, pp. 1–37–2.
Chung, Kin–Man and Yuen, Herbert, "A 'Tiny' Pascal Compiler: the P–Code Interpreter," BYTE Publications, Inc., Sep. 1978.
Chung, Kin–Man and Yuen, Herbert, "A 'Tiny' Pascal Compiler: Part 2: The P–Compiler," BYTE Publications, Inc., Oct. 1978.
Thompson, Ken, "Regular Expression Search Algorithm," Communications of the ACM, vol. II, No. 6, p. 149 et seq., Jun. 1968.
Mitchell, James G., Maybury, William, and Sweet, Richard, Mesa Language Manual, Xerox Corporation.
McDaniel, Gene, "An Analysis of a Mesa Instruction Set," Xerox Corporation, May 1982.
Pier, Kenneth A., "A Retrospective on the Dorado, A High–Performance Personal Computer," Xerox Corporation, Aug. 1983.
Pier, Kenneth A., "A Retrospective on the Dorado, A High–Performance Personal Computer," IEEE Conference Proceedings, The 10th Annual International Symposium on Computer Architecture, 1983.
Goldberg, Adele and Robson, David, "Smalltalk—80: The Language," ParcPlace Systems and Xerox PARC, Addison–Wesley Publishing Company, 1989, Chap. 21, pp. 417–442.
Budd, Timothy, "A Little Smalltalk," Oregon State University, Addison–Wesley Publishing Company, 1987, Chap. 13, pp. 150–160, Chapter 14, pp. 161–175, Chapter 15, pp. 176–192.
Krasner, Glenn, "The Smalltalk–80 Virtual Machine" BYTE Publications Inc., Aug. 1991, pp. 300–320.
Engelstad, Steve, et al., "A Dynamic C–Based Object–Oriented System for Unix," Software, May 1991, pp. 73–85.
Deutsch, L. Peter, et al., "Efficient Implementation of the Smartalk–80 System," Conference Record of the Eleventh Annual ACM Symposium on Principles of Programming Languages, Jan. 15–18, 1984, pp. 297–302.

* cited by examiner

METHOD AND APPARATUS FOR RESOLVING DATA REFERENCES IN GENERATED CODE

Matter enclosed in heavy brackets [ ] appears in the original patent but forms no part of this reissue specification; matter printed in italics indicates the additions made by reissue.

This is a continuation of reissue application Ser. No. 08/755,764, filed Nov. 21, 1996, now U.S. Pat. Re. No. 36,204, which is incorporated herein by reference.

BACKGROUND OF THE INVENTION

1. Field of the Invention

The present invention relates to the field of computer systems, in particular, programming language compilers and interpreters of these computer systems. More specifically, the present invention relates to resolving references in compiler generated object code.

2. Background

The implementation of modern programming languages, including object oriented programming languages, are generally grouped into two categories: compiled and interpreted.

In a compiled programming language, a computer program (called a compiler) compiles the source program and generates executable code for a specific computer architecture. References to data in the generated code are resolved prior to execution based on the layout of the data objects that the program deals with, thereby, allowing the executable code to reference data by their locations. For example, consider a program that deals with a point data object containing two variables x and y, representing the x and y coordinates of a point, and further assume that the variables x and y are assigned slots 1 and 2 respectively, in each instance of the point data object. Thus, an instruction that accesses or fetches y, such as the Load instruction 14 illustrated in FIG. 1, is resolved to reference the variable y by the assigned slot 2 before the instruction sequence is executed. Particular examples of programming language compilers that generate code and resolve data references in the manner described above include C and C++ compilers.

This "compiled" approach presents problems when a program is constructed in pieces, which happens frequently under object oriented programming. For example, a program may be constructed from a library and a main program. If a change is made to the library, such that the layout of one of the data objects it implements is changed, then clients of that library, like the main program, need to be recompiled. Continuing the preceding example, if the point data object had a new field added at the beginning called name, which contains the name of the point, then the variables x and y could be reassigned to slots 2 and 3. Existing programs compiled assuming that the variables x and y and are in slots 1 and 2 will have to be recompiled for them to execute correctly.

In an interpreted language, a computer program (called a translator) translates the source statements of a program into some intermediate form, typically independent of any computer instruction set. References to data in the intermediate form are not fully resolved before execution based on the layout of the data objects that the program deals with. Instead, references to data are made on a symbolic basis. Thus, an instruction that accesses or fetches y, such as the Load instruction 14' illustrated in FIG. 1, references the variable y by the symbolic name "y". The program in intermediate form is executed by another program (called an interpreter) which scans through the code in intermediate form, and performs the indicated actions. Each of the symbolic references is resolved during execution each time the instruction comprising the symbolic reference is interpreted. A particular example of a programming language interpreter that translates source code into intermediate form code and references data in the manner described above is the BASIC interpreter.

The "interpreted" approach avoids the problems encountered with the "compiled" approach, when a program is constructed in pieces. However, because of the extra level of interpretation at execution time, each time an instruction comprising a symbolic reference is interpreted, execution is slowed significantly.

Thus, it is desirable if programming languages can be implemented in a manner that provides the execution performance of the "compiled" approach, and at the same time, the flexibility of the "interpreted" approach for altering data objects, without requiring the compiled programs to be recompiled. As will be disclosed, the present invention provides a method and apparatus for resolving data references in compiler generated object code that achieves the desired results.

SUMMARY OF THE INVENTION

A method and apparatus for generating executable code and resolving data references in the generated code is disclosed. The method and apparatus provides execution performance substantially similar to the traditional compiled approach, as well as the flexibility of altering data objects like the traditional interpreted approach. The method and apparatus has particular application to implementing object oriented programming languages in computer systems.

Under the present invention, a hybrid compiler-interpreter comprising a compiler for "compiling" source program code, and an interpreter for interpreting the "compiled" code, is provided to a computer system. The compiler comprises a code generator that generates code in intermediate form with data references made on a symbolic basis. The interpreter comprises a main interpretation routine, and two data reference handling routines, a static field reference routine for handling numeric references and a dynamic field reference routine for handling symbolic references. The dynamic field reference routine, when invoked, resolves a symbolic reference and rewrites the symbolic reference into a numeric reference. After rewriting, the dynamic field reference routine returns to the interpreter without advancing program execution to the next instruction, thereby allowing the rewritten instruction with numeric reference to be reexecuted. The static field reference routine, when invoked, obtain data for the program from a data object based on the numeric reference. After obtaining data, the static field reference routine advances program execution to the next instruction before returning to the interpreter. The main interpretation routine selectively invokes the two data reference handling routines depending on whether the data reference in an instruction is a symbolic or a numeric reference.

As a result, the "compiled" intermediate form object code of a program achieves execution performance substantially similar to that of the traditional compiled object code, and yet it has the flexibility of not having to be recompiled when the data objects it deals with are altered like that of the traditional translated code, since data reference resolution is performed at the first execution of a generated instruction comprising a data reference.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

A method and apparatus for generating executable code and resolving data references in the generated code is disclosed. The method and apparatus provides execution performance substantially similar to the traditional compiled approach, as well as the flexibility of altering data objects like the traditional interpreted approach. The method and apparatus has particular application to implementing object oriented programming languages. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1A:
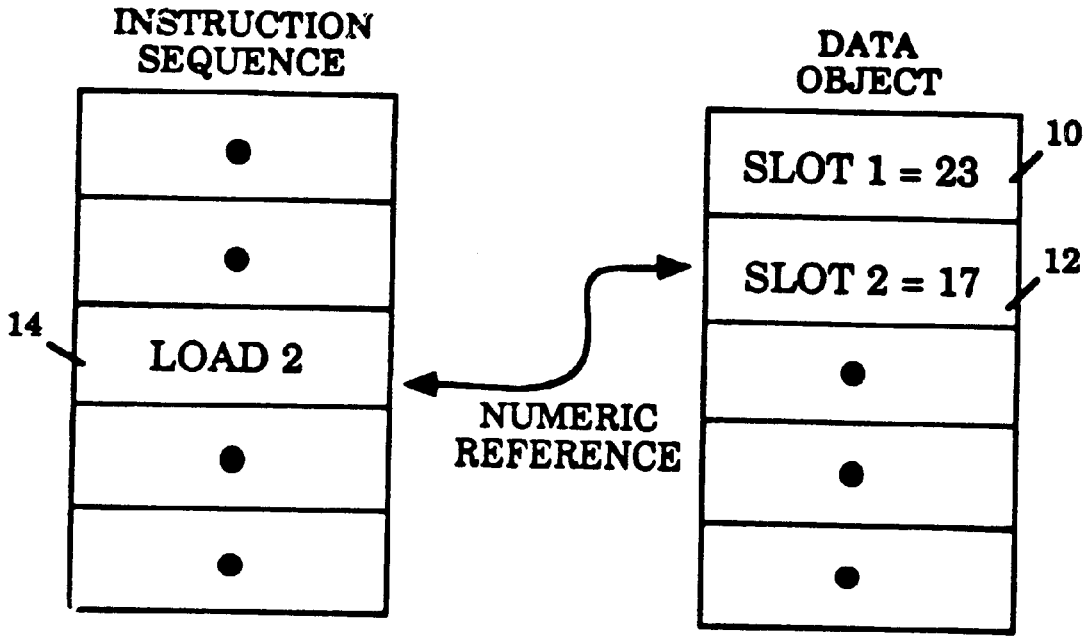
Figure 1A Prior Art
FIG. 1 shows the prior art compiled approach and the prior art interpreted approach to resolving data reference.
Figure 1B:
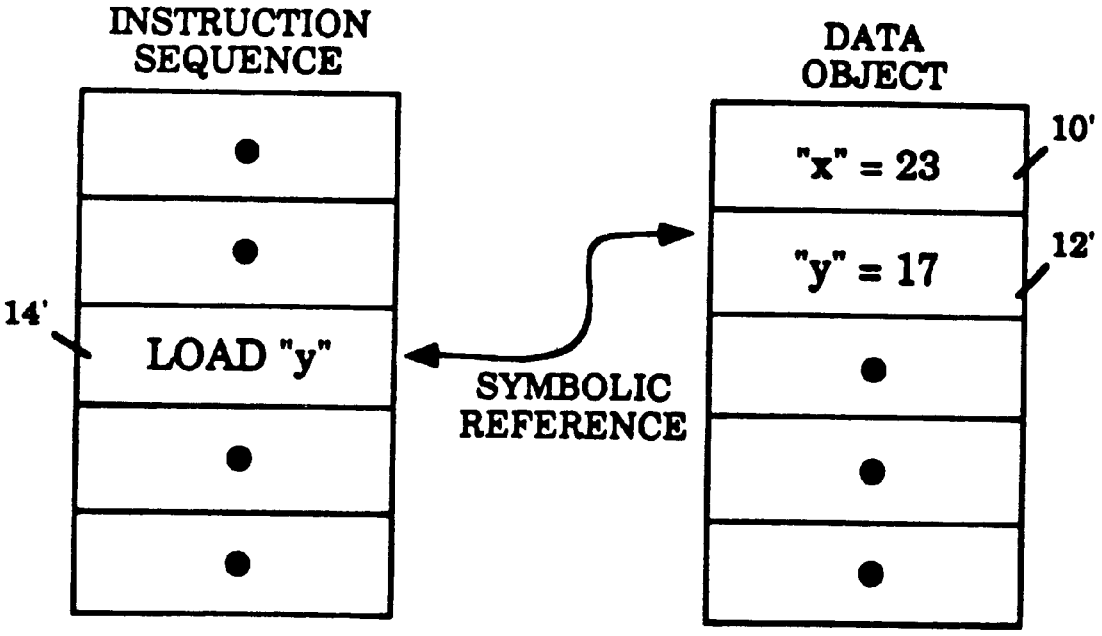
Figure 1B Prior Art
Figure 2:
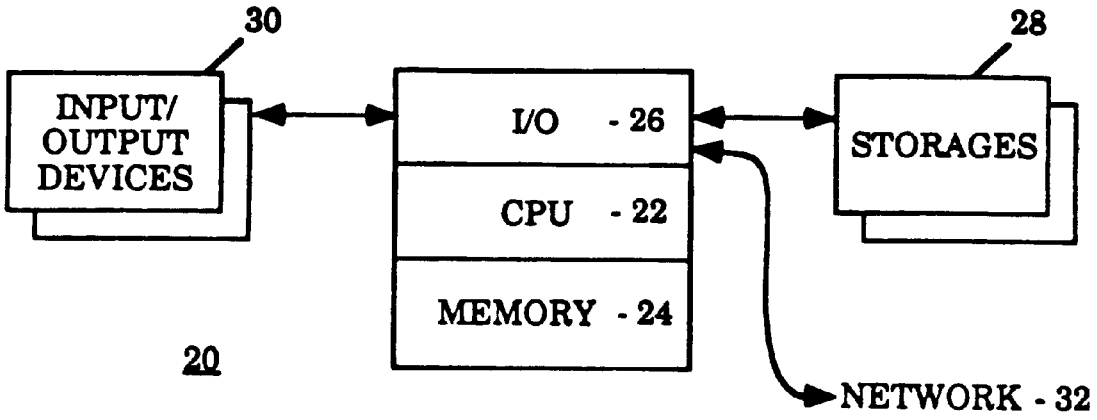
FIG. 2 illustrates an exemplary computer system incorporated with the teachings of the present invention.
Figure 3:
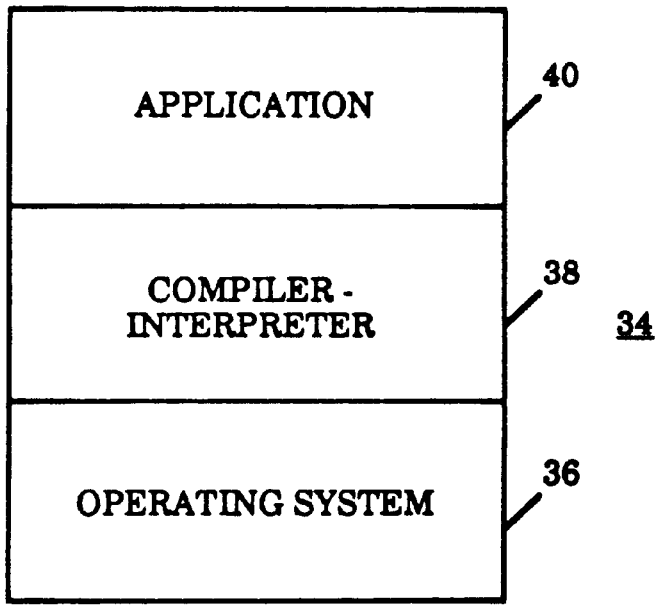
FIG. 3 illustrates the software elements of the exemplary computer system of FIG. 2.

Referring now to FIGS. 2 and 3, two block diagrams illustrating an exemplary computer system incorporated with the teachings of the present invention are shown. As shown in FIG. 2, the exemplary computer system 20 comprises a central processing unit (CPU) 22, a memory 24, and an I/O module 26. Additionally, the exemplary computer system 20 also comprises a number of input/output devices 30 and a number of storage devices 28. The CPU 22 is coupled to the memory 24 and the I/O module 26. The input/output devices 30, and the storage devices 28 are also coupled to the I/O module 26. The I/O module 26 in turn is coupled to a network 32.

Except for the manner they are used to practice the present invention, the CPU 22, the memory 24, the I/O module 26, the input/output devices 30, and the storage devices 28, are intended to represent a broad category of these hardware elements found in most computer systems. The constitutions and basic functions of these elements are well known and will not be further described here.

As shown in FIG. 3, the software elements of the exemplary computer system of FIG. 2 comprises an operating system 36, a hybrid compiler-interpreter 38 incorporated with the teachings of the present invention, and applications compiled and interpreted using the hybrid compiler-interpreter 38. The operating system 36 and t he applications 40 are intended to represent a broad categories of these software elements found in many computer systems. The constitutions and basic functions of these elements are also well known and will not be described further. The hybrid compiler-interpreter 38 will be described in further detail below with references to the remaining figures.

Figures 4, 5:
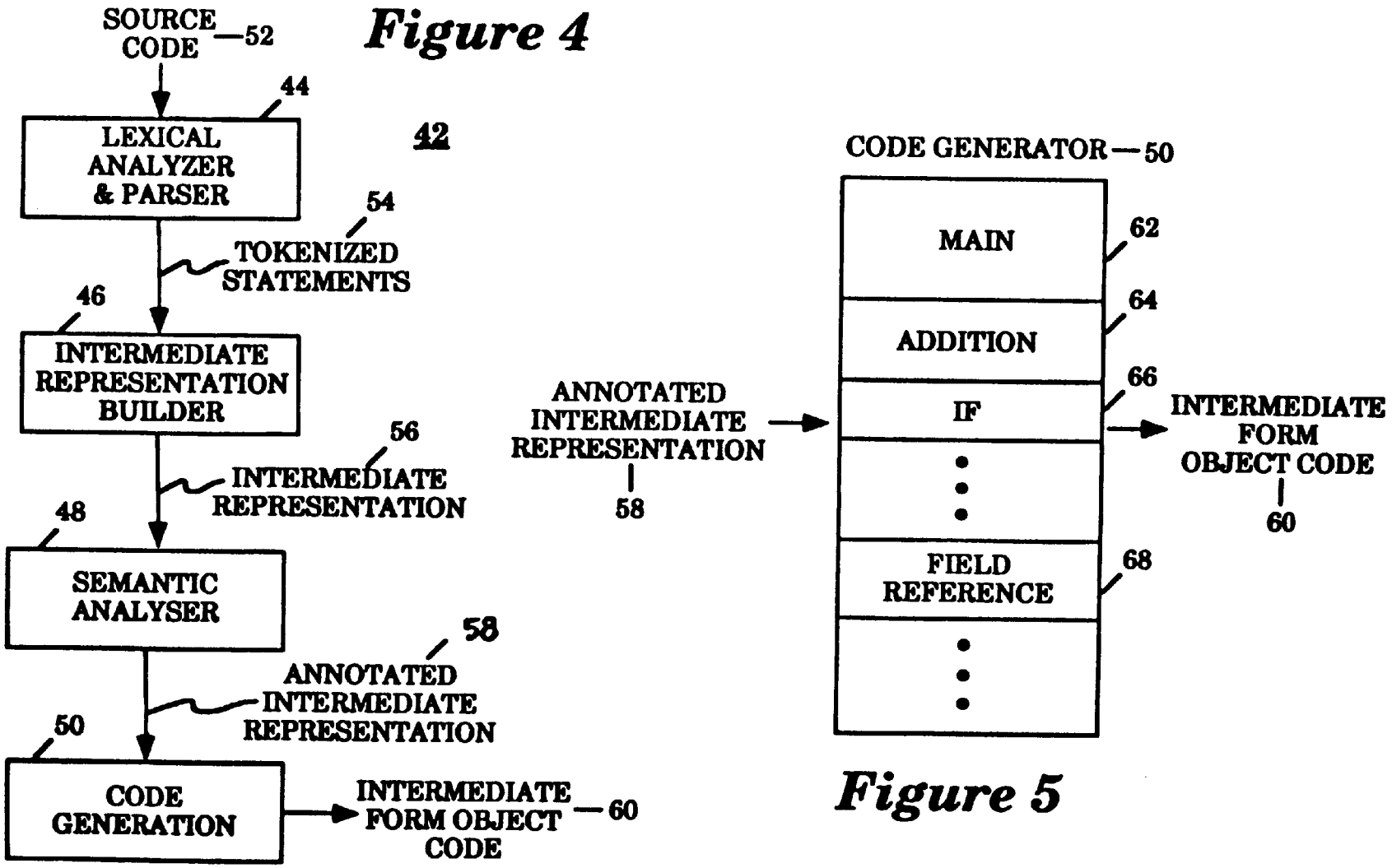
FIG. 4 illustrates one embodiment of the compiler of the hybrid compiler-interpreter of the present invention.
FIG. 5 illustrates one embodiment of the code generator of the compiler of FIG. 4.

Referring now to FIGS. 4 and 5, two block diagrams illustrating the compiler of the hybrid compiler-interpreter of the present invention are shown. Shown in FIG. 4 is one embodiment of the compiler 42 comprising a lexical analyzer and parser 44, an intermediate representation builder 46, a semantic analyzer 48, and a code generator 50. These elements are sequentially coupled to each other. Together, they transform program source code 52 into tokenized statements 54, intermediate representations 56, annotated intermediate representations 58, and ultimately intermediate form code 60 with data references made on a symbolic basis. The lexical analyzer and parser 44, the intermediate representation builder 46, and the semantic analyzer 48, are intended to represent a broad category of these elements found in most compilers. The constitutions and basic functions of these elements are well known and will not be otherwise described further here. Similarly, a variety of well known tokens, intermediate representations, annotations, and intermediate forms may also be used to practice the present invention.

As shown in FIG. 5, the code generator 50 comprises a main code generation routine 62, a number of complimentary operator specific code generation routines for handling the various operators, such as the ADD and the IF code generation routines, 64 and 66, and a data reference handling routine 68. Except for the fact that generated coded 60 are in intermediate form and the data references in the generated code are made on a symbolic basis, the main code generation routine 62, the operator specific code generation routines, e.g. 64 and 66, and the data reference handling routine 68, are intended to represent a broad category of these elements found in most compilers. The constitutions and basic functions of these elements are well known and will not be otherwise described further here.

For further descriptions on various parsers, intermediate representation builders, semantic analyzers, and code generators, see A. V. Aho, R. Sethi, and J. D. Ullman, Compilers Principles, Techniques and Tools. Addision-Wesley, 1986, pp. 25–388, and 463–512.

Figure 6:
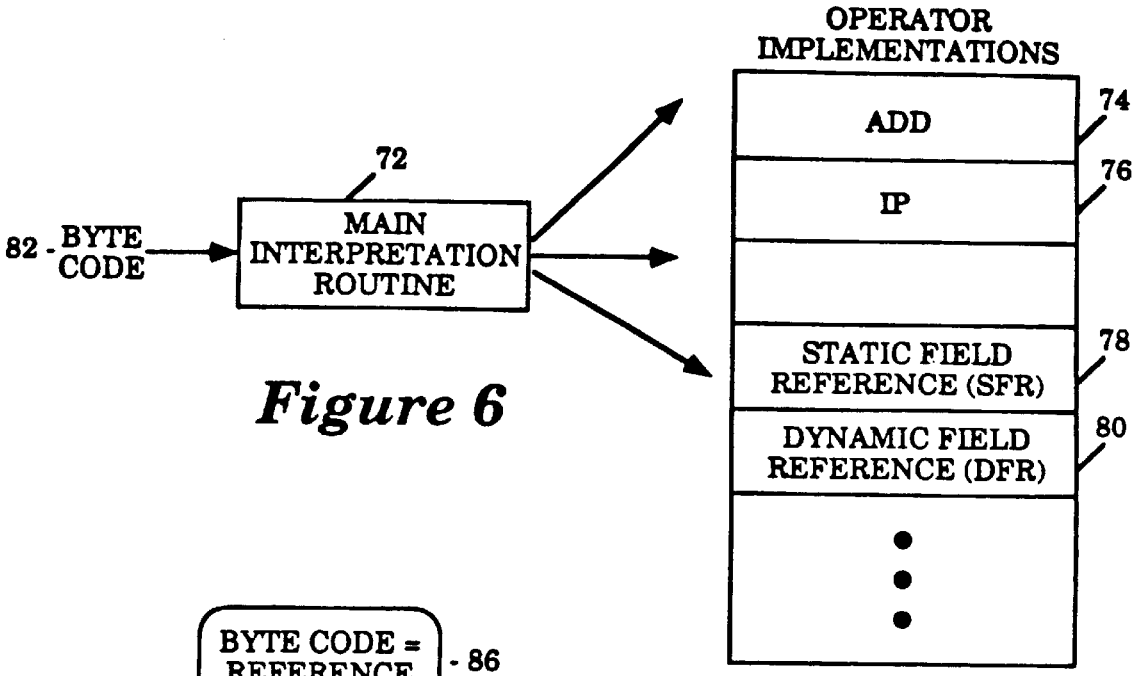
FIG. 6 illustrates one embodiment of the interpreter and operator implementations of the hybrid compiler-interpreter of the present invention.
Figure 7:
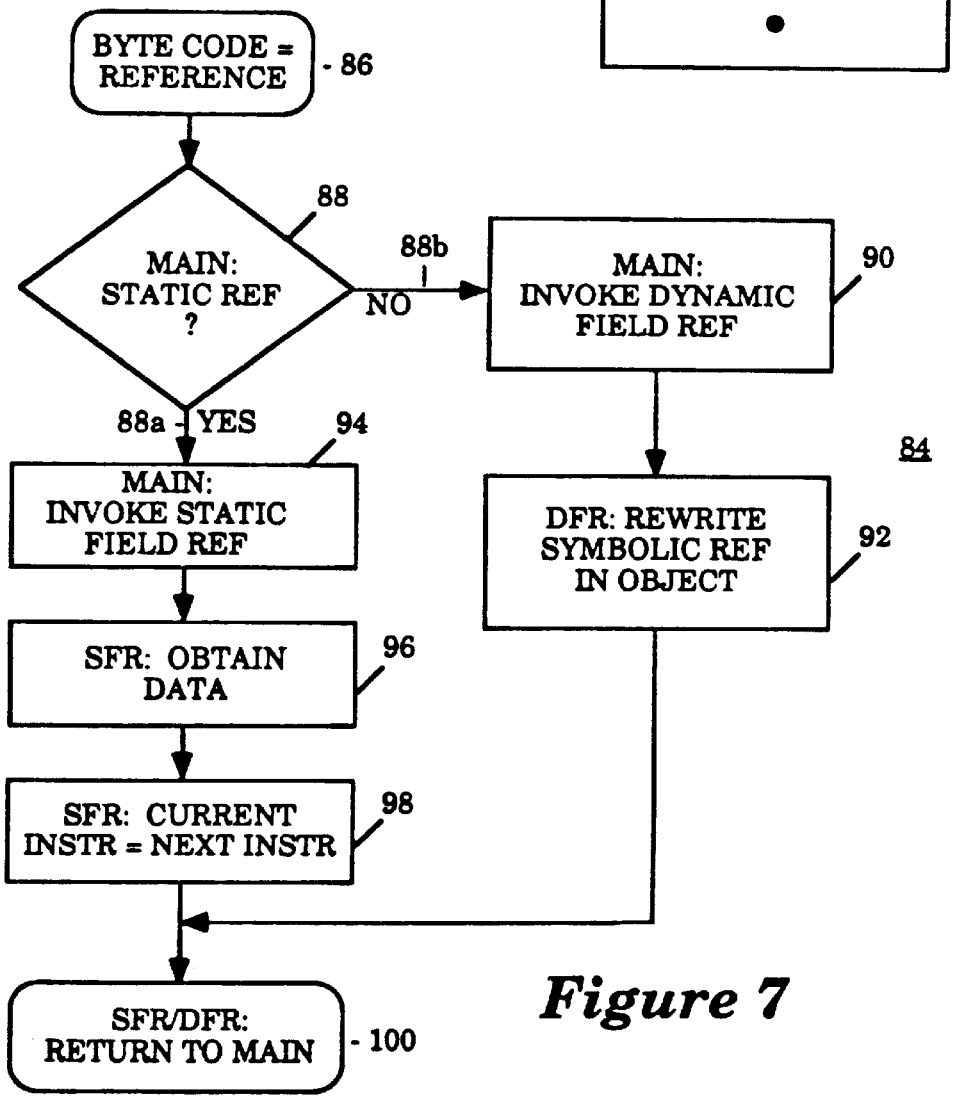
FIG. 7 illustrates the cooperative operation flows of the main interpretation routine, the static field reference routine and the dynamic field reference routine of the present invention.

Referring now to FIGS. 6 and 7, two block diagrams illustrating one embodiment of the interpreter of the hybrid compiler-interpreter of the present invention and its operation flow for handling data references is shown. As shown in FIG. 6, the interpreter 70 comprises a main interpretation routine 72, a number of complimentary operator specific interpretations routines, such as the ADD and the IF interpretation routines, 74 and 76, and two data reference interpretation routines, a static field reference routine (SFR) and a dynamic field reference routine (DFR), 78 and 80. The main interpreter routine 72 receives the byte codes 82 of the intermediate form object code as inputs, and interprets them, invoking the operator specific interpretations routines, e.g. 74 and 76, and the data reference routines, 78 and 80, as necessary. Except for the dynamic field reference routine 80, and the manner in which the main interpretation routine 72 and the state field reference routine 78 cooperates with the dynamic field reference routine 80 to handle data references, the main interpretation routine 72, the operator specific interpretation routines, e.g. 74 and 76, and the static field reference routine 78, are intended to represent a broad category of these elements found in most compilers and interpreters. The constitutions and basic functions of these elements are well known and will not be otherwise described further here.

As shown in FIG. 7, upon receiving a data reference byte code, block 86, the main interpretation routine determines if the data reference is static, i.e. numeric, or dynamic, i.e. symbolic, block 88. If the data reference is a symbolic reference, branch 88b, the main interpretation routine invokes the dynamic field reference routine, block 90. Upon invocation, the dynamic field reference routine resolves the symbolic reference, and rewrites the symbolic reference in the intermediate form object code as a numeric reference, block 92. Upon rewriting the data reference in the object code, the dynamic field reference routine returns to the main interpretation routine, block 100, without advancing the program counter. As a result, the instruction with the rewritten numeric data reference gets reexecuted again.

On the other hand, if the data reference is determined to be a numeric reference, branch 88a, the main interpretation routine invokes the static field reference routine, block 94. Upon invocation, the static field reference routine obtain the data reference by the numeric reference, block 96. Upon obtaining the data, the static field reference routine advances the program counter, block 98, and returns to the main interpretation routine, block 100.

Figure 8:
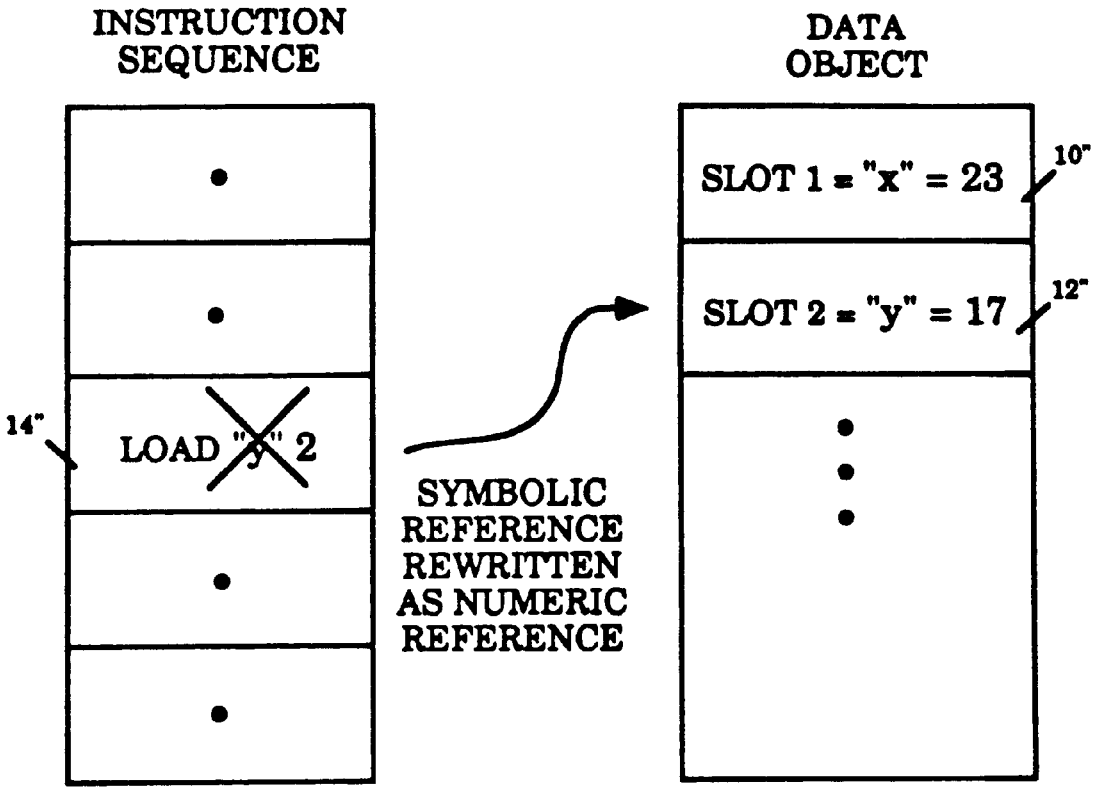
FIG. 8 illustrates an exemplary resolution and rewriting of a data reference under the present invention.

Referring now to FIG. 8, a block diagram illustrating the alteration and rewriting of data references under the present invention in further detail is shown. As illustrated, a data referencing instruction, such as the LOAD instruction 14", is initially generated with a symbolic reference, e.g. "y". Upon its first interpretation in execution, the data referencing instruction, e.g. 14, is dynamically resolved and rewritten with a numeric reference, e.g. slot 2. Thus, except for the first execution, the extra level of interpretation to resolve the symbolic reference is no longer necessary. Therefore, under the present invention, the "compiled" intermediate form object code of a program achieves execution performance substantially similar to that of the traditional compiled object code, and yet it has the flexibility of not having to be recompiled when the data objects it deals with are altered like that of the traditional translated code, since data reference resolution is performed at the first execution of a generated instruction comprising a symbolic reference.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

[1. In a computer system comprising a program in source code form, a method for generating executable code for said program and resolving data references in said generated code, said method comprising the steps of:

a) generating executable code in intermediate form for said program in source code form with data references being made in said generated code on a symbolic basis, said generated code comprising a plurality of instructions of said computer system;

b) interpreting said instructions, one at a time, in accordance to a program execution control;

c) resolving said symbolic references to corresponding numeric references, replacing said symbolic references with their corresponding numeric references, and continuing interpretation without advancing program execution, as said symbolic references are encountered while said instructions are being interpreted; and d) obtaining data in accordance to said numeric references, and continuing interpretation after advancing program execution, as said numeric references are encountered while said instruction are being interpreted;

said steps b) through d) being performed iteratively and interleaving.]

[2. The method as set forth in claim 1, wherein, said program in source code form is implemented in source code form of an object oriented programming language.]

[3. The method as set forth in claim 2, wherein said programming language is C.]

[4. The method as set forth in claim 2, wherein, said programming language is C++.]

[5. The method as set forth in claim 1, wherein, said program execution control is a program counter said continuing interpretation in step c) is achieved by performing said step b) after said c) without incrementing said program counter; and said continuing interpretation in said step d) is achieved by performing said step b) after said d) after incrementing said program counter.]

[6. In a computer system comprising a program in source code form, an apparatus for generating executable code for said program and resolving data references in said generated code, said apparatus comprising:

a) compilation means for receiving said program in source code form and generating executable code in intermediate form for said program in source code form with data references being made in said generated code on a symbolic basis, said generated code comprising a plurality of instructions of said computer system;

b) interpretation means for receiving said generated code and interpreting said instructions, one at a time;

c) dynamic reference handling means coupled to said interpretation means for resolving said symbolic references to corresponding numeric references, replacing said symbolic references with their corresponding numeric references, and continuing interpretation by said interpretation means without advancing program execution, as said symbolic references are encountered while said instructions are being interpreted by said interpretation means; and d) static reference handling means coupled to said interpretation means for obtaining data in accordance to said numeric references, and continuing interpretation by said interpretation means after advancing program execution, as said numeric references are encountered while said instruction are being interpreted by said interpretation means;

said interpretation means, said dynamic reference handling means, and said static reference handling means performing their corresponding functions iteratively and interleavingly.]

[7. The apparatus as set forth in claim 6, wherein, said program in source code form is implemented in source code form of an object oriented programming language.]

[8. The apparatus as set forth in claim 7, wherein, said programming language is C.]

[9. The apparatus as set forth in claim 7, wherein, said programming language is C++.]

[10. The apparatus as set forth in claim 6, wherein, and program execution control is a program counter.]

*11. An apparatus comprising:*

*a memory containing intermediate form object code constituted by a set of instructions, certain of said instructions containing one or more symbolic references; and*

*a processor configured to execute said instructions containing one or more symbolic references by determining a numerical reference corresponding to said symbolic reference, storing said numerical references, and obtaining data in accordance to said numerical references.*

*12. A computer-readable medium containing instructions for controlling a data processing system to perform a method for interpreting intermediate form object code comprised of instructions, certain of said instructions containing one or more symbolic references, said method comprising the steps of:*

*interpreting said instructions in accordance with a program execution control; and*

*resolving a symbolic reference in an instruction being interpreted, said step of resolving said symbolic reference including the substeps of:*

*determining a numerical reference corresponding to said symbolic reference, and*

*storing said numerical reference in a memory.*

*13. A computer-implemented method for executing instructions, certain of said instructions containing one or more symbolic references, said method comprising the steps of:*

*resolving a symbolic reference in an instruction, said step of resolving said symbolic reference including the substeps of:*

*determining a numerical reference corresponding to said symbolic reference, and*

*storing said numerical reference in a memory.*

*14. The method of claim 3, wherein said substep of storing said numerical reference comprises the substep of replacing said symbolic reference with said numerical reference.*

*15. The method of claim 3, wherein said step of resolving said symbolic reference further comprises the substep of executing said instruction containing said symbolic reference using the stored numerical reference.*

*16. The method of claim 3, wherein said step of resolving said symbolic reference further comprises the substep of advancing program execution control after said substep of executing said instruction containing said symbolic reference.*

*17. In a computer system comprising a program, a method for executing said program comprising the steps of:*

*receiving intermediate form object code for said program with symbolic data references in certain instructions of said intermediate form object code; and*

*converting the instructions of the intermediate form object code having symbolic data references, said converting step comprising the substeps of:*

*resolving said symbolic references to corresponding numerical references,*

*storing said numerical references, and*

*obtaining data in accordance to said numerical references.*

*18. A computer-implemented method for executing program operations, each operation being comprised of a set of instructions, certain of said instructions containing one or more symbolic references, said method comprising the steps of:*

*receiving a set of instructions reflecting an operation; and*

*performing the operation corresponding to the received set of instructions, wherein at least one of said symbolic references is resolved by determining a numerical reference corresponding to said symbolic reference, storing said numerical reference, and obtaining data in accordance to said stored numerical reference.*

*19. A memory for use in executing a program by a processor, the memory comprising:*

*intermediate form code containing symbolic field references associated with an intermediate representation of source code for the program,*

*the intermediate representation having been generated by lexically analyzing the source code and parsing output of said lexical analysis, and*

*wherein the symbolic field references are resolved by determining a numerical reference corresponding to said symbolic reference, and storing said numerical reference in a memory.*

*20. A computer-implemented method comprising:*

*receiving a program that comprises a set instructions written in an intermediate form code;*

*replacing each instruction in the program with a symbolic data reference with a new instruction containing a numeric reference resulting from invocation of a dynamic field reference routine to resolve the symbolic data reference; and*

*executing the program by performing an operation in accordance with each instruction or new instruction, depending upon whether an instruction has been replaced with a new instruction in accordance with the replacing step.*

*21. A data processing system, comprising:*

*a processor; and*

*a memory comprising a control program for causing the processor to (i) receive a program that comprises a set instructions written in an intermediate form code, (ii) replace each instruction in the program with a symbolic data reference with a new instruction containing a numeric reference resulting from invocation of a dynamic field reference routine to resolve the symbolic data reference, and (iii) execute the program by performing an operation in accordance with each instruction or new instruction, depending upon whether an instruction has been replaced with a new instruction in accordance with the replacing step.*

*22. An apparatus comprising:*

*a memory containing a compiled program in intermediate form object code constituted by a set of instructions, at least one of the instructions containing a symbolic reference; and*

*a processor configured to execute the instruction by determining a numerical reference corresponding to the symbolic reference, and performing an operation in accordance with the instruction and data obtained in accordance with the numerical reference without recompiling the program or any portion thereof.*

*23. A computer-implemented method, comprising:*

*receiving a program with a set instructions written in an intermediate form code;*

*analyzing each instruction of the program to determine whether the instruction contains a symbolic reference to a data object; and*

*executing the program, wherein when it was determined that an instruction contains a symbolic reference, data*

*from a storage location identified by a numeric reference correspoding to the symbolic reference is used thereafter to perform an operation corresponding to that instruction.*

*24. A computer-implemented method for executing a program comprised of bytecodes, the method comprising:*

*determining immediately prior to execution whether a bytecode of the program contains a symbolic data reference;*

*when it is determined that the bytecode of the program contains a symbolic data reference, invoking a dynamic field reference routine to resolve the symbolic data reference; and*

*executing thereafter the bytecode using stored data located using a numeric reference resulting from the resolution of the symbolic reference.*

*25. A data processing system, comprising:*

*a processor; and*

*a memory comprising a program comprised of bytecodes and instructions for causing the processor to (i) determine immediately prior to execution of the program whether a bytecode of the program contains a symbolic data reference, (ii) when it is determined that the bytecode of the program contains a symbolic data reference, invoke a dynamic field reference routine to resolve the symbolic data reference, and (iii) execute thereafter the bytecode using stored data located using a numeric reference resulting from the resolution of the symbolic reference.*

*26. A computer program product containing instructions for causing a computer to perform a method for executing a program comprised of bytecodes, the method comprising:*

*determining immediately prior to execution whether a bytecode of the program contains a symbolic data reference;*

*when it is determined that the bytecode of the program contains a symbolic data reference, invoking a dynamic field reference routine to resolve the symbolic data reference; and*

*executing thereafter the bytecode using stored data located using a numeric reference resulting from the resolution of the symbolic reference.*

*27. A computer-implemented method comprising:*

*receiving a program with a set of original instructions written in an intermediate form code;*

*generating a set of new instructions for the program that contain numeric references resulting from invocation of a routine to resolve any symbolic data references in the set of original instructions; and*

*executing the program using the set of new instructions.*

*28. A data processing system, comprising:*

*a processor; and*

*a memory comprising a control program for causing the processor to (i) receive a program with a set of original instructions written in an intermediate form code, (ii) generate a set of new instructions for the program that contain numeric references resulting from invocation of a routine to resolve any symbolic data references in the set of original instructions, and (iii) executing the program using the set of new instructions.*

*29. A computer program product containing instructions for causing a computer to perform a method, the method comprising:*

*receiving a program with a set of original instructions written in an intermediate form code;*

*generating a set of new instructions for the program that contain numeric references resulting from invocation of a routine to resolve any symbolic data references in the set of original instructions; and*

*executing the program using the set of new instructions.*

*30. A computer-implemented method comprising:*

*receiving a program that comprises a set instructions written in an intermediate form code;*

*replacing each instruction in the program with a symbolic data reference with a new instruction containing a numeric reference resulting from invocation of a dynamic field reference routine to resolve the symbolic data reference; and*

*executing the program by performing an operation in accordance with each instruction or new instruction, depending upon whether an instruction has been replaced with a new instruction in accordance with the replacing step.*

*31. A data processing system, comprising:*

*a processor; and*

*a memory comprising a control program for causing the processor to (i) receive a program that comprises a set instructions written in an intermediate form code, (ii) replace each instruction in the program with a symbolic data reference with a new instruction containing a numeric reference resulting from invocation of a dynamic field reference routing to resolve the symbolic data reference, and (iii) execute the program by performing an operation in accordance with each instruction or new instruction, depending upon whether an instruction has been replaced with a new instruction in accordance with the replacing step.*

*32. A computer program product containing control instructions for causing a computer to perform a method, the method comprising:*

*receiving a program that comprises a set instructions written in an intermediate form code;*

*replacing each instruction in the program with a symbolic data reference with a new instruction containing a numeric reference resulting from invocation of a dynamic field reference routine to resolve the symbolic data reference; and*

*executing the program by performing an operation in accordance with each instruction or new instruction, depending upon whether an instruction has been replaced with a new instruction in accordance with the replacing step.*

*33. A computer-implemented method, comprising:*

*receiving a program with a set instructions written in an intermediate form code;*

*analyzing each instruction of the program to determine whether the instruction contains a symbolic reference to a data object; and*

*executing the program, wherein when it was determined that an instruction contains a symbolic reference, data from a storage location identified by a numeric reference corresponding to the symbolic reference is used thereafter to perform an operation corresponding to that instruction.*

*34. A data processing system, comprising:*

*a processor; and*

*a memory comprising a control program for causing the processor to (i) receive a program with a set instructions written in an intermediate form code, (ii) analyze each instruction of the program to determine whether*

*the instruction contains a symbolic reference to a data object, and (iii) execute the program, wherein when it was determined that an instruction contains a symbolic reference, data from a storage location identified by a numeric reference corresponding to the symbolic reference is used thereafter to perform an operation corresponding to that instruction.*

*35. A computer program product containing control instructions for causing a computer to perform a method, the method comprising:*

*receiving a program with a set instructions written in an intermediate form code;*

*analyzing each instruction of the program to determine whether the instruction contains a symbolic reference to a data object; and*

*executing the program, wherein when it was determined that an instruction contains a symbolic reference, data from a storage location identified by a numeric reference corresponding to the symbolic reference is used thereafter to perform an operation corresponding to that instruction.*

*36. A computer-implemented method for executing a program comprised of bytecodes, the method comprising:*

*determining whether a bytecode of the program contains a symbolic reference;*

*when it is determined that the bytecode contains a symbolic reference, invoking a dynamic field reference routine to resolve the symbolic reference; and*

*performing an operation identified by the bytecode thereafter using data from a storage location identified by a numeric reference resulting from the invocation of the dynamic field reference routine.*

*37. A data processing system, comprising:*

*a processor; and*

*a memory comprising a program comprised of bytecodes and instructions for causing the processor to (i) determine whether a bytecode of the program contains a symbolic reference, (ii) when it is determined that the bytecode contains a symbolic reference, invoke a dynamic field reference routine to resolve the symbolic reference, and (iii) perform an operation identified by the bytecode thereafter using data from a storage location identified by a numeric reference resulting from the invocation of the dynamic field reference routine.*

*38. A computer program product containing instructions for causing a computer to perform a method for executing a program comprised of bytecodes, the method comprising:*

*determining whether a bytecode of the program contains a symbolic reference;*

*when it is determined that the bytecode contains a symbolic reference, invoking a dynamic field reference routine to resolve the symbolic reference; and*

*performing an operation identified by the bytecode therafter using data from a storage location identified by a numeric reference resulting from the invocation of the dynamic field reference routine.*

*39. A computer-implemented method comprising:*

*receiving a program formed of instructions written in an intermediate form code compiled from source code;*

*analyzing each instruction to determine whether it contains a symbolic field reference; and*

*executing the program by performing an operation identified by each instruction, wherein data from a storage location identified by a numeric reference is thereafter used for the operation when the instruction contains a symbolic field reference, the numeric reference having been resolved from the symbolic field reference.*

*40. A data processing system, comprising:*

*a processor; and*

*a memory comprising a control program for causing the processor to (i) receive a program formed of instructions written in an intermediate form code compiled from source code, (ii) analyze each instruction to determine whether it contains a symbolic field reference, and (iii) execute the program by performing an operation identified by each instruction, wherein data from a storage location identified by a numeric reference is thereafter used for the operation when the instruction contains a symbolic field reference, the numeric reference having been resolved from the symbolic field reference.*

*41. A computer program product containing control instructions for causing a computer to perform a method, the method comprising:*

*receiving a program formed of instructions written in an intermediate form code compiled from source code;*

*analyzing each instruction to determine whether it contains a symbolic field reference; and*

*executing the program by performing an operation identified by each instruction, wherein data from a storage location identified by a numeric reference is used thereafter for the operation when the instruction contains a symbolic field reference, the numeric reference having been resolved from the symbolic field reference.*

* * * * *

UNITED STATES PATENT AND TRADEMARK OFFICE

CERTIFICATE OF CORRECTION

PATENT NO. : RE 38,104 E
DATED : April 29, 2003
INVENTOR(S) : James Gosling

It is certified that error appears in the above-identified patent and that said Letters Patent is hereby corrected as shown below:

Title Page,
Item (57), ABSTRACT,
Line 24, please replace "interaction in" with -- instruction is --.

Column 6,
Line 15, please replace "interleaving" with -- interleavingly --.
Line 18, after "wherein", please insert a comma.
Line 23, after "counter", please insert a semicolon.
Line 25, please replace "said c)" with -- said step c) --.

Column 7,
Lines 3-4, please replace "and program execution" with -- said program execution --.
Lines 38, 41 and 45, please replace " 3" with -- 13 --.

Column 8,
Lines 20-33, delete the claim in its entirety and insert therefore:

*--20. A computer-implemented method for executing a compiled program containing instructions in an intermediate form code, at least one of the instructions containing a symbolic reference, said method comprising the steps of:*

*resolving the symbolic reference in the instruction by determining a numerical reference corresponding to the symbolic reference; and*

*performing an operation in accordance with the instruction and data obtained in accordance with the numerical reference without recompiling the program or any portion thereof.--.*

Lines 34-47, delete the claim in its entirety and insert therefore:

*--21. A memory encoded with a compiled program, the memory comprising:*

*intermediate form code containing symbolic field references associated with an intermediate representation of source code for the program,*

*the intermediate representation having been generated by lexically analyzing the source code and parsing output of said lexical analysis,*

*such that when the program is executed by a processor each symbolic field reference is resolved by determining a numerical reference corresponding to the symbolic field reference and data is obtained in accordance with the numerical reference without recompiling the program or any portion thereof.--.*

UNITED STATES PATENT AND TRADEMARK OFFICE

CERTIFICATE OF CORRECTION

PATENT NO. : RE 38,104 E
DATED : April 29, 2003
INVENTOR(S) : James Gosling

It is certified that error appears in the above-identified patent and that said Letters Patent is hereby corrected as shown below:

Column 8, line 60 - Column 9, line 4,
Delete the claim in its entirety and insert therefore:

*-- 23. A computer-readable medium containing instructions for controlling a data processing system to perform a method for interpreting a compiled program in intermediate form object code comprised of instructions, at least one of the instructions containing a symbolic reference, said method comprising the steps of:*

*resolving the symbolic reference in the instruction by determining a numerical reference corresponding to the symbolic reference; and*

*performing an operation in accordance with the instruction and data obtained in accordance with the numerical reference without recompiling the program or any portion thereof. --.*

Column 10,
Lines 7, 23-24, 37, 50 and 65-66, please replace "*a set instructions*" with -- *a set of instructions* --.
Line 28, please replace "*routing*" with -- *routine* --.

Column 11,
Line 11, please replace "*a set instructions*" with -- *a set of instructions* --.

Column 12,
Line 7, please replace "*therafter*" with -- *thereafter* --.

Signed and Sealed this

Sixteenth Day of September, 2003

JAMES E. ROGAN
*Director of the United States Patent and Trademark Office*

US00RE38104C1

(12) EX PARTE REEXAMINATION CERTIFICATE (10151st)

United States Patent

Gosling

(10) Number: US RE38,104 C1

(45) Certificate Issued: *May 9, 2014

(54) METHOD AND APPARATUS FOR RESOLVING DATA REFERENCES IN GENERATED CODE

(76) Inventor: James Gosling, Redwood City, CA (US)

Reexamination Request:
No. 90/011,490, Feb. 15, 2011

Reexamination Certificate for:

| | |
|---|---|
| Patent No.: | **Re. 38,104** |
| Issued: | **Apr. 29, 2003** |
| Appl. No.: | **09/261,970** |
| Filed: | **Mar. 3, 1999** |

Certificate of Correction issued Sep. 16, 2003

( * ) Notice: This patent is subject to a terminal disclaimer.

Related U.S. Patent Documents

Reissue of:

| | |
|---|---|
| (64) Patent No.: | **5,367,685** |
| Issued: | **Nov. 22, 1994** |
| Appl. No.: | **07/994,655** |
| Filed: | **Dec. 22, 1992** |

Related U.S. Application Data

(63) Continuation of application No. 08/755,764, filed on Nov. 21, 1996, now Pat. No. Re. 36,204, which is an application for the reissue of Pat. No. 5,367,685.

(51) Int. Cl.
*G06F 9/445* (2006.01)

(52) U.S. Cl.
USPC ..... 717/140; 717/106; 717/136; 717/139; 717/142; 717/146

(58) Field of Classification Search
USPC ..... 713/1
See application file for complete search history.

(56) References Cited

To view the complete listing of prior art documents cited during the proceeding for Reexamination Control Number 90/011,490, please refer to the USPTO's public Patent Application Information Retrieval (PAIR) system under the Display References tab.

*Primary Examiner* — Eric B Kiss

(57) ABSTRACT

A hybrid compiler-interpreter comprising a compiler for "compiling" source program code, and an interpreter for interpreting the "compiled" code, is provided to a computer system. The compiler comprises a code generator that generates code in intermediate form with data references made on a symbolic basis. The interpreter comprises a main interpretation routine, and two data reference handling routines, a dynamic field reference routine for handling symbolic references, and a static field reference routine for handling numeric references. The dynamic field reference routine, when invoked, resolves a symbolic reference and rewrites the symbolic reference into a numeric reference. After re-writing, the dynamic field reference routine returns to the main interpretation routine without advancing program execution to the next instruction, thereby allowing the rewritten instruction with numeric reference to be reexecuted. The static field reference routine, when invoked, obtain data for the program from a data object based on the numeric reference. After obtaining data, the static field reference routine advances program execution to the next instruction before returning to the interpretation routine. The main interpretation routine selectively invokes the two data reference handling routines depending on whether the data reference in an instruction is a symbolic or a numeric reference.

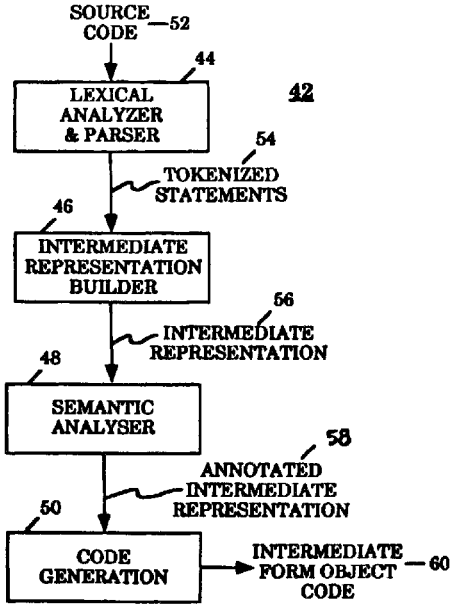

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 were previously cancelled.

Claims 11-41 are cancelled.

* * * * *